(12) United States Patent
Zonnefeld

(10) Patent No.: US 10,777,176 B2
(45) Date of Patent: Sep. 15, 2020

(54) TOOLBOXES, SYSTEMS, KITS AND METHODS RELATING TO SUPPLYING PRECISELY TIMED, SYNCHRONIZED MUSIC

(71) Applicant: Wenda Brooke Zonnefeld, Kirkland, WA (US)

(72) Inventor: Wenda Brooke Zonnefeld, Kirkland, WA (US)

( * ) Notice: Subject to any disclaimer, the term of this patent is extended or adjusted under 35 U.S.C. 154(b) by 129 days.

(21) Appl. No.: 15/685,145

(22) Filed: Aug. 24, 2017

(65) Prior Publication Data

US 2018/0061381 A1 Mar. 1, 2018

Related U.S. Application Data

(60) Provisional application No. 62/379,154, filed on Aug. 24, 2016.

(51) Int. Cl.
| | |
|---|---|
| *G10H 1/00* | (2006.01) |
| *G11B 27/10* | (2006.01) |
| *G11B 27/30* | (2006.01) |
| *G10G 1/00* | (2006.01) |
| *H04N 5/05* | (2006.01) |

(52) U.S. Cl.
CPC ............ *G10H 1/0008* (2013.01); *G10G 1/00* (2013.01); *G11B 27/10* (2013.01); *G11B 27/3036* (2013.01); *H04N 5/05* (2013.01); *G10H 2210/046* (2013.01); *G10H 2210/061* (2013.01); *G10H 2210/375* (2013.01); *G10H 2210/391* (2013.01); *G10H 2220/121* (2013.01); *G10H 2240/325* (2013.01)

(58) Field of Classification Search
CPC .. G10G 1/00; G10H 1/0008; G10H 2210/046; G10H 2210/061; G10H 2240/325; G10H 2210/375; G10H 2220/121; G10H 2210/391; H04N 5/05; G11B 27/10
USPC .......................................................... 386/285
See application file for complete search history.

(56) References Cited

U.S. PATENT DOCUMENTS

| | | | | |
|---|---|---|---|---|
| 5,877,445 | A * | 3/1999 | Hufford | G10H 1/0025 84/602 |
| 8,563,843 | B1 * | 10/2013 | Shemesh | G10H 7/00 84/723 |
| 2004/0223553 | A1 * | 11/2004 | Kumar | H04L 1/0059 375/259 |
| 2006/0259862 | A1 * | 11/2006 | Adams | G11B 27/034 715/716 |
| 2007/0207847 | A1 * | 9/2007 | Thomas | G07F 17/32 463/17 |
| 2010/0257994 | A1 * | 10/2010 | Hufford | G10H 1/0025 84/609 |

(Continued)

*Primary Examiner* — Loi H Tran

(57) ABSTRACT

Systems, devices, and methods, etc., that provide digital audio toolboxes, music kits, digital audio tracks, etc., herein supply digital audio tracks such as music for combination with and synchronization with digital pre-existing media tracks. The toolkits, etc., herein provide users with visual tracks in media, to create, provide and/or synchronize precisely timed tracks used in audio media productions, or otherwise to provide multiple, precisely timed and synced tracks where a music/sound design track from the toolkits is added to a pre-made media track such as a visual footage.

24 Claims, 5 Drawing Sheets

(56) References Cited

U.S. PATENT DOCUMENTS

2013/0336499 A1* 12/2013 Beckhardt ............... G06F 16/60
                                                         381/81
2015/0046824 A1*  2/2015 Humphrey ............ G06F 3/0481
                                                        715/727

* cited by examiner

120 BPM & 29.97 Drop Frame - Frame Rate Map

Accuracy of beat to be synced within 4 to 5 frames
is needed to match the human brains 2 msec window of ability W. Zonnefeld

BEATS PER MINUTE
♩ = 120

Depending on the desired tempo fractional tempos are often needed. This tempo is *not* fractional.

SMPTE TIME CODE measures visual frame rate
Hours : Minutes : Seconds : Frames Per Second Middle Line Stands for
Bar . Beat . 100th of a second

00:00:00:00    00:00:01:29    00:00:03:29    00:00:05:29

[measures 1–4]

00:00:15:00
8.3.03
15 second mark

Slashes represent beats
In most forms of music, the first beat is the strongest Musical Beat.

00:00:07:29    00:00:09:29    00:00:11:29    00:00:13:29

[measures 5–8]

A "measure" or a "bar" in music normally has 3 or 4 beats within them. In this demonstaration the slash mark represents one beat. Measures are commonly grouped together in grouping that are divisible by 4. Often melodies will be 4, 8, 12, 16, etc. long in "bars". If the last bar at a synchronization point is NOT divisible by 4, the music is recognizably peculiar unless a film composer trained in disguising techniques has composed the music in a way to disguise the peculiarities of time.*

00:00:15:29    00:00:17:29    00:00:19:29    00:00:21:29

[measures 9–12]

Most music library music tracks do not include any film composer beat disguises or techniqes, since it is impossible for the song maker to guess the digital details of a film without study-
ing the film / video or animation with the proper software to successfully use film composer trained disguises or techniques.

00:00:30:00
16.1.06
30 second mark

Already recognizably "Off"

00:00:23:29    00:00:25:29    00:00:27:29    00:00:29:29

[measures 13–16]

*The measures (long squares with slash marked beats)
between time markers also need to be divisible by 4,
if not, the music will have peculiarities for the listener.

00:00:31:29    00:00:33:29    00:00:35:28    00:00:37:28

[measures 17–20]

FIGURE 1a

Once "Off" the sound gets further and further "Off" exponentially. Below there are 2 more full seconds "Off" adding to the lost synchronization. We need to be as close as a 2 msec "Window". Any fractional amount of time within the 2 msec "Window" for will work for tricking the human brain to thinking the synchronization to be exact.

00:00:59:28
30.4.99
1 minute mark

No longer evenly divisible by 4 !
2 full bars of "Drift" Rythmically

FIGURE 1b

TOOLBOXES, SYSTEMS, KITS AND METHODS RELATING TO SUPPLYING PRECISELY TIMED, SYNCHRONIZED MUSIC

BACKGROUND

The music media world and visual media world have a communication gap. The information provided for audio and music in visual editing software, audio player software, and music track libraries states a specific length of time for the music but it is typically inaccurate; the accurate measurement has been rounded off. This is important because the "rounding off" error introduces a gap in timing between the music and its correlated visual media such that an average human can hear a "hiccup". There can also be a hiccup where two different pieces of audio abut each other. To many listeners or users, it is annoying at the least. This can also occur when adding a second audio track to a pre-existing audio track.

This gap has created headaches for an editor user, i.e., a person attempting to apply new music/audio to fit pre-existing film, video or other visual media, such as such as film/visual editors or other video, radio, film, animation, motion graphic and virtual reality editors, who must match an audio track purchased from a music library with a second media track such as an audio or visual track. It's very difficult to do.

Thus, there has gone unmet a need for improved methods of providing highly synchronized audio and visual tracks in digital media, and/or for providing customizable audio tracks for such digital media. The present systems and methods, etc., provide these and/or other advantages.

SUMMARY

The present systems, devices, digital audio tracks, and methods, etc., provide digital audio toolboxes, music kits, etc., that, among other advantages, fill the gap between very cheap but poorly created and synchronized music for commercials and very expensive but narrow and difficult to create music (and other audio) for shows such as commercials, movies, tv, etc. The kits are convenient and easy to use, while raising the quality level of the production.

Many problems can happen, sometimes all at once, when it comes to syncing music and other audio to visual productions, as well as for music/audio to other audio tracks such as radio broadcasts, pod casts and other audio-only. For a visual arts example, frame rates are not easy to match to music. In one aspect, this is because television started on black and white sets at 30/frames per second. When color sets were invented, to retain compatibility with black and white sets, the frame/field rate for the color sets was shifted slightly to 29.97/59.94 to avoid interference artifacts amongst the TV signals' internal components (e.g., line scan rate, vertical refresh rate, color carrier). This is close enough to 30/60 for black and white sets to work while avoiding the interference issues. Thus, the current toolboxes, kits, systems, etc., recognize that properly oriented music and other audio has very precise time measurements, such as timecodes, when syncing to visuals and other pre-determined tracks.

Another factor relating to the current toolboxes, kits, systems, etc., is that generally audio has a window of two milliseconds to synchronize "realistically" with visual media for purposes of human perception. In other words, the visual event in a show should synchronize within 2 milliseconds (msec) with an associated musical/audio event for the human brain to perceive the two events as happening simultaneously. However, current film and audio numbers based in traditional timecode systems, such as SMPTE (Society of Motion Picture and Television Engineers, https://en.wikipedia.org/wiki/SMPTE_timecode) and TEMPO (MIDI, https://en.wikipedia.org/wiki/MIDI_timecode), are incompatible with how the human brain perceives things. Humans hear faster than they see, and as mentioned above, the "rounding off" error in such traditional systems introduces a gap in timing between the music and its correlated visual media such that an average human can hear a "hiccup" or "clip".

Another problem is that often when music is recorded, it has its own signature/unique ambience. Even if one were to match the time and pitch, the ambience can be different between different studios or even different recordings from a studio.

The current toolboxes, kits, systems, methods, etc., herein resolve one or more of these issues. For example, the different components of the music (audio, etc.) in the toolboxes, kits, etc., herein are created to fit and match and combine with each other seamlessly, i.e., without apparent or undesired change in timing (correlation to visuals), theme, pitch, etc., to an average human observer. The music within a given toolbox, kit, digital audio track, etc., is internally coordinated and internally consistent. For example, such music/audio within a toolbox, kit, digital audio track, etc. is in-tune, has the same tempo and has coherent themes. In some embodiments, "themes" may be referred to as "songs". However, "themes" includes other audio pieces that may or may not include vocals. The tempos, etc., are then digitally, precision to fit to visual media such as commercials, audio media such as radio broadcasts, or other media as desired.

Thus, provided herein are digital audio toolboxes, digital audio tracks, etc., comprising a plurality of precisely timed audio components comprising a unified theme. In some embodiments, a plurality of unified themes can be provided if desired. The precisely timed audio components can be Broadcast Way Quality unless a user desired a different quality of audio or compressed audio. The precisely timed audio components and associated visual editing software can be set at 48 kHz or 44.1 kHz and 24 bit to avoid artifacts when the film or other visual media is rendered.

The precisely timed audio components typically comprise a first section identified as an audio beginning section, a second section identified as an audio interlude section, and a third section an audio ending section, wherein each of the audio beginning section, the audio interlude section and the audio ending section is identified with a time code accurate within 2 msecs to the length of such section. Of course, the specific words used above, such as "audio beginning section" are not critical; any identifiers conveying that the toolbox comprises at least two or at least three, or more, distinct sections of precisely timed audio/music comprising a coherent theme is suitable and is contained within the exemplary wording herein. In some embodiments, the toolboxes provide, and the user has, a choice of several first, middle(s) or ending components of different lengths. For an example where the choice of different middle sections, the toolkits, etc., also provide changes in time code locations for the middle sections.

The different first, second, third, etc., sections can be configured to work together once beginning and endings are chosen. In other words, in some embodiments, initially the first and third sections are chosen then the second or middle section(s). A chosen beginning can be "snapped" into place at to "00" time, then a chosen ending can then be snapped in place in front of the ultimate ending time (e.g., snapped into place to end at a total of 15 sec, 20 sec, 30 sec, 60 sec, etc.). A directory or "white sheet" can be provided to explain which middle section(s) will work with the chosen combination of beginning and ending in terms of total elapsed time; the white sheet may also comprise hit points, exemplary tempo or rhythm combinations, etc.

The toolboxes, kits, digital audio track, etc., herein provide choices to users. One user may have one opinion as to what would work best and another user a different opinion. A given user may only choose to use part of the toolbox. A single component of music can also be provided, particularly where that single component further comprises a precise identification of hit points, as discussed elsewhere herein. In certain embodiments, forms are provided for the user to submit royalty payments or other consideration in exchange for using a given song, whether in whole or in part.

When the toolboxes, kits, systems, methods, etc., herein, one or more for the following expenditures are no longer needed:

Time and money for music development/research
Time and money for the production of demos
Time for reviewing and approving demo
Time and money for interfacing with evolving edits/visual FX
Time and money for Preparations of "Final" session (booking studio, talent)
Time and money for copying (a copyist supplies printed music for live musicians)
Time and money for Final record and mix.
Time and money for Adjustments needed after presentation has been reviewed These and other aspects, features and embodiments are set forth within this application, including the following Detailed Description and attached drawings. Unless expressly stated otherwise, all embodiments, aspects, features, etc., can be mixed and matched, combined and permuted in any desired manner. In addition, various references are set forth herein; all such references are incorporated herein by reference in their entirety and for all their teachings and disclosures, regardless of where the references may appear in this application.

BRIEF DESCRIPTION OF THE DRAWINGS

FIGS. 1a to 1c depict an example of the effects of lack of synchronization between music and video (or other framerate based messaging medium). This example in FIGS. 1a to 1c provides a Frame Rate Map for a portion of music comprising 120 BPM & a 29.97 Drop Frame.

DETAILED DESCRIPTION

Figure 1C:
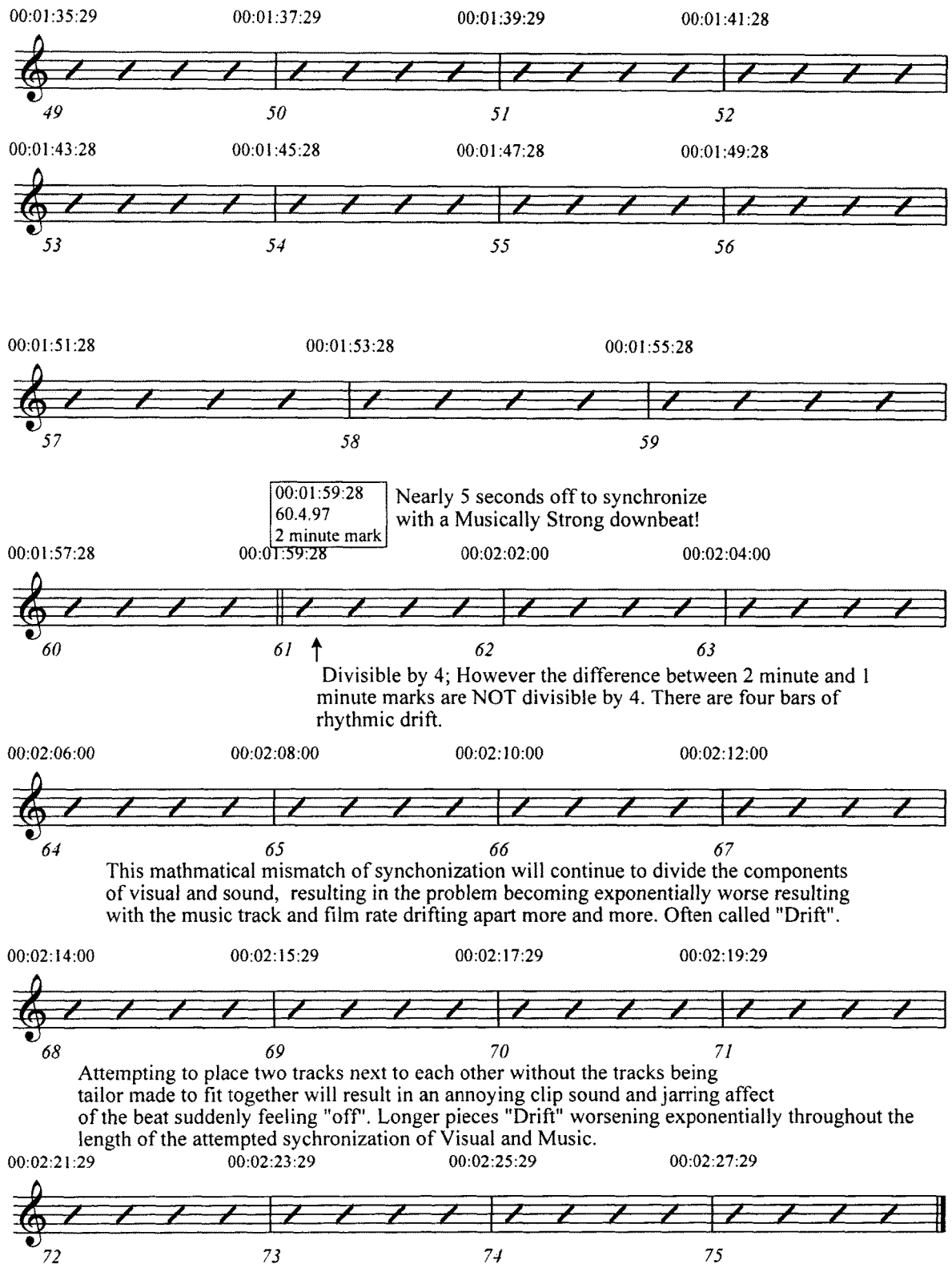

The present toolboxes, digital audio track, kits, systems, methods, etc., herein supply digital audio tracks such as music for combination with and synchronization with digital pre-existing media tracks. "Digital pre-existing media tracks" indicates a premade visual or audio track or section including for example existing visual media, specific timed sections of broadcast media and film, and radio medium genres in need of music synchronization; such can also be thought of as pre-existing visual and/or radio medium genres in need of music or sound design synchronization. Such digital pre-existing media tracks also include visual media tracks of any type for advertising production houses or other users. The toolkits, etc., herein provide a solution for editor users seeking to create, provide and/or synchronize audio tracks with visual tracks in media, to create, provide and/or synchronize precisely timed tracks used in audio media productions, or otherwise to provide multiple, precisely timed and synced tracks where a music/sound design track from the toolkits is added to a pre-made media track such as a visual footage. Exemplary uses include 15 second, 30 second, 45 second, 60 second and 120 second commercial productions, such as for product advertisements of such lengths, as well as for tv shows, podcasts, movies, etc.

In some embodiments, the systems, kits, methods, etc., comprise at least one music track sufficient for the entire length of a commercial advertisement or other media presentation along with a "white sheet"/directory of "hit points"; "hit points" are locations within the music track that work well with certain film/video edit cuts. If desired, when all of the hit points have an edited cut, or in addition to the original hit points even if not all used for edited cuts, more hit points and editing can be added; such can also be added to the white sheet/directory if desired. Providing such hit points connected to edited cuts, customizes the audio track/commercial such that the audio track appears to be custom made for the commercial.

In some embodiments, the toolboxes, systems, kits and methods, etc., comprise "bookends" of music/audio for use with visuals, i.e., beginning and ending music configured to bookend shows. Such embodiments may be particularly useful for users who have web/internet programs.

The music/audio is provided in high-precision lengths, e.g., ±5 milliseconds, 4 milliseconds, 3 milliseconds, 2 milliseconds, 1 millisecond, 0.5 millisecond, or even more precise if desired. The user, such as an editor of a show, can be provided with a white sheet or directory exactly explaining/identifying durations for titles, end credits, etc. Such directories, and other features and aspects of the kits as appropriate, can be written in industry recognized codes such as SMPTE (Society of Motion Picture and Television Engineers) format, e.g., SMPTE time codes, https://en.wikipedia.org/wiki/SMPTE_timecode, as well as other recognized time codes such as Manchester code, Linear timecode, Vertical interval timecode, Burnt-in timecode, MIDI timecode, or AEC-EBU timecode, all of which are discussed at the same cited above as well as other locations.

In some embodiments, the toolboxes, systems, digital audio tracks, kits and methods, etc., comprise combinable, precisely timed audio components that are labeled and numbered such that they can be combined in a variety of permutations and combinations at the desire of a user but that, because of their labeling and numbering, retain the essence of the musical theme (or other coherence feature) within the given piece of music. Thus, variations of the music are possible by using different components. Blank sections for voice over or other non-music space can also be provided. Thus, for example, the user can create a piece of coherent, precisely timed continuous music; music that gains or loses energy or complexities; or music with both high-volume and low-volume sections, or even music with high-volume, low-volume and extended length, precisely timed silent sections (silent sections in music are typically called "rests", and such are included in the toolkit components herein; also included are silent sections comprising no information other than the temporal (time) length of the silence).

As a loose analogy, in some embodiments, using the toolboxes, kits, methods, etc., can be similar to coordinating wardrobe of clothing, with mixing and matching different elements of the wardrobe with each other to provide an ultimate, coordinated ensemble. Thus, mixing and matching the music components is possible, and if desired a white sheet, discussed above, can provide information about the component and instructions for how to do make the ultimate coordinated ensemble.

In some embodiments, a plurality of toolboxes, digital audio tracks, kits, etc., are provided, where each toolbox or kit has variations and sections from the same theme. In further embodiments, a plurality of toolboxes, kits, etc., are provided, where each toolbox or kit (or groupings of such toolboxes/kits) each of different variations and sections for different themes.

In some embodiments, the toolboxes, systems, kits and methods, etc., comprise music kits consisting of a single theme, i.e., the music as a whole in such kit., etc., consists essentially of a single coherent there. Such theme, and therefore the toolbox or kit in turn, comprises, or even consists essentially of, sections of music specifically created at exact tempos and lengths, typically measured and identified within 1 msec or 2 msec, so that the sections can be used together to create the theme. The sections can be placed in different locations to meet specific needs of a visual portion of the media presentation that is being created.

For example, most visual media has a beginning, middle and end. The musical sections can be put in different orders and still sound coherent within the single theme (or multiple themes can be provided and organized if desired, either within a single kit properly identified and coordinated as such, or in multiple kits each providing a single theme). The musical (or other audio) sections labeled to be a "beginning" or "ending" or "middle". The musical sections are provided in different length options, for example so that the production, such as a commercial, can have a blank (silent) spot having no music, for example so that a voice over (VO) and/or other theme can be added. Such as silent musical section block can be labeled so that the editor/user knows it is a "VO" section within the kit.

In some embodiments, the white sheet/instructions comprise information or instructions advising the editor/user whether some musical sections work better together than others: the white sheet/instructions can advise how the musical building blocks can fit together and still sound good. The white sheet/instructions can also comprise recommendations for first establishing an ending musical section(s), then providing the beginning musical section, and then sorting amongst multiple possible middle sections to provide the user with his/her desired audio components in the middle.

As an example, the toolboxes, kits, methods, etc., herein enhance the ability of a user to create end-product music for visual media where the music is both thematically consistent and digitally accurate. Certain fractional tempos provided in the toolboxes, kits, methods, etc., help this happen. In normal music making a typical tempo (speed of beats) is 120 beats per minute. However, for music to synchronize accurately for visual media within the constraints of the frame rates that are commonly used, the tempos are often needed to be fractional so that the accuracy is within two milliseconds, or other desired accuracy as discussed herein, to coordinate with how fast the human brain processes audio (discussed above). Thus, a tempo may have a speed such as "159.69", which is an example of an excellent tempo for synchronization for a 15-second commercial. The toolboxes, kits, methods, etc., herein provide musical sections that "snap" together into the commercial and into a film editing software.

In some embodiments, the toolboxes, systems, kits and methods, etc., further comprise a version of the music that isn't cut into sections or blocks, but instead are full lengths for desired purposes, such as full lengths of 15, 30 and 60 seconds. For such toolbox, kit, etc., a white sheet/directions is provided that tells the editor or other user exactly where in the full-length version the musical "hits" (places of interests, or a sort of musical punctuation) are located. Such "hits" can be identified using SMPTE or other suitable time code. In such embodiments, if the film editor wants to "cut to the music", he or she can mark the points in SMPTE timecode within the film editing software and have the sections of film line up with the musical hits. The timecode hits can be given in several versions of timecode options.

In further embodiments, the toolboxes, systems, kits and methods, etc., can comprise "decision trees" or other step-by-step instructions or options. For example, where the toolboxes, kits, methods, etc., herein are provided via a website, the website provides a music player (or provides code that can be played in a client-located music player, etc.) that provides a full version example of the music. Such version can allow a user to determine if he/she likes it that particular theme or would prefer a different theme from the multiple themes that are provided. Thus, for example, a client/user can hear a 15, 30 or 60 second theme that has been made specifically for commercials to determine its suitability for a particular visual media presentation—or choose a different one. This avoids the problem in some music libraries where only much longer tracks are provided, which takes a significantly longer time to review and curate. The user/editor can then use the audio kits herein to make precision audio for the visuals, for example to fill the space of audio completely or partially at the client's choice.

The present application is further directed to methods of making the various elements of the toolboxes, digital audio tracks, systems, etc., herein, including making the toolboxes, systems, etc., themselves from various elements. The toolboxes, systems, etc., also apply to methods of using the same, including for example applying the toolboxes, systems, etc., to make commercials, films, videos, video blogs, podcasts, etc., or otherwise as desired.

The digital audio toolbox can also comprise a cue sheet comprising information to be provided to a Performance Rights Organization (PRO).

EXAMPLES

Example 1: Catered Music/Things are Gonna be Much Betta

Things are Gonna be Much Betta
"Things are Gonna be Much Betta" (TAGBMB) is a happy go lucky type of tune. A user can identify it from its acronym at the end of its track name if desired. TAGBMB is designed to have room for a branding Voice Over (VO) after the final chord. The coordinating mix and match pieces can build up to make the song more complicated or pare down. If only version 'A' is used from each section it becomes an Acoustic Bass feature. Another option is to simply choose a Version, for example: "V.1_A", and use each piece named down the alphabet (A, B, C, etc.). This exemplary song has many ways it can be applied.

Things Gonna_V.5_Full. Example of a Full Version; may be used, for example, to cut/edit a film to match a 15 second commercial or can be used as an ending for a longer commercial.

The Thing Are Gonna Be Much Betta (TGBMB) V.1 are all 12 seconds long.
- V.1_A May be used as an intro or place anywhere in a longer commercial or both.
- V.1_B May be used after V.1A for building or after for sound pared down.
- V.1_C May be used after V.1B for building or after for sound pared down.

TGBMB V.2 Tracks have a different ending than V1 tracks and are all 12 seconds long
- V.2_A May be used as an intro or place anywhere in a longer commercial or both!
- V.2_B May be used after V.1A for building or after for sound pared down.
- V.2_C May be used after V.1B for building or after for sound pared down.

TGBMB V.3 Tracks have a different ending than V1 tracks and are slightly longer at 15 seconds long
- V.3_A May be used as an intro or place anywhere in a longer commercial or both!
- V.3_B May be used after V.1A for building or after for sound pared down.
- V.3_C May be used after V.1B for building or after for sound pared down.

TGBMB V.4 Tracks are very short measuring 5 seconds long
- V.4_A Can be used to fill in or make a musical remark.
- V.4_B Can be used to fill in or make a musical remark. It can also be used after V.4A T TGBMB V.5 Are created to be used at the end of your production measuring 15 seconds long with room for a branding VO after the final note
- V.5_A Is a Bass Solo Ending.
- V.5_B Has a Bass and Drums Ending
- V.5_C Has a Bass, Drums and Guitar Ending TGBMB V.6 Track is an extra of just solo Bass. It is 15 seconds long and can be used to fill in a longer commercial.

Example 2: 120 MAP 29.97 ND

Example 2 refers to FIGS. 1a to 1c and shows an example of the effects of lack of synchronization between music and video. This example in FIGS. 1a to 1c provides a Frame Rate Map for a portion of music comprising 120 BPM & a 29.97 Drop Frame.

Some general information for the frame rate map:
BEATS PER MINUTE in the example in FIGS. 1a to 1c=120
SMPTE TIME CODE measures visual frame rate and is shown as, "Hours:Minutes:Seconds:Frames Per Second".
Slashes in the staff represent beats.
The middle line between staffs FIGS. 1a to 1c stands for "Bar. Beat. 100th of a second"
The Accuracy of beat to be synced should be within 4 to 5 frames to match the human brain's 2 msec window of ability. In most forms of music, the first beat is the strongest Musical Beat.
Depending on the desired tempo fractional tempos are often needed. This tempo is *not* fractional as can be used for the systems, etc., herein.

Some general discussion of the frame rate map in FIGS. 1a to 1c:

A "measure" or a "bar" in music normally has 3 or 4 beats within them. In this demonstration in FIGS. 1a to 1c the slash mark represents one beat. Measures are commonly grouped together in grouping that are divisible by 4. Often melodies will be 4, 8, 12, 16, etc., long in "bars". If the last bar at a synchronization point is NOT divisible by 4, the music is recognizably peculiar unless a film composer trained in disguising techniques has composed the music in a way to disguise the peculiarities of time—The measures in the staff (long squares with slash marked beats) between time markers also need to be divisible by 4, if not, the music will have peculiarities for the listener.

Most music library music tracks do not include any film composer beat disguises or techniques, since it is impossible for the song maker to guess the digital details of a film without studying the film/video or animation with the proper software to successfully use film composer trained disguises or techniques.

In the example provided in FIGS. 1a to 1c, the synchronization is already recognizably "Off" as of the 30 second mark (00:00:30:00; 16.1.06) without the present toolboxes, kits, etc. Once "Off" the sound gets further and further "Off" exponentially. At the 60 second mark (00:00:30:00; 16.1.06), the synchronization is off by more than 2 full seconds. Generally, it is desired to be as close as a 2 msec "Window" for synchronization: Any fractional amount of time within the 2 msec "Window" will work for tricking the human brain to thinking the synchronization to be exact. Also at the 60 second mark, the last bar at the synchronization point is the No longer evenly divisible by 4; there is 2 full bars of "Drift" Rhythmically.

In the example provided in FIGS. 1a to 1c, at the 2 minute mark (00:01:59:28; 60.4.97) the synchronization is nearly 5 seconds off to synchronize with a musically strong downbeat! Thus, at measure 61 the measure is divisible by 4; however the difference between 2 minute and 1 minute marks are NOT divisible by 4. There are four bars of rhythmic drift. This mathematical mismatch of synchronization will continue to divide the components of visual and sound, resulting in the problem becoming exponentially worse resulting with the music track and film rate drifting apart more and more. Often called "Drift".

The example provided in FIGS. 1a to 1c, shows that attempting to place two tracks next to each other without the tracks being tailor made to fit together will result in an annoying clip sound and a jarring effect of the beat suddenly feeling "off". Further, the "drift" for pieces that are longer in time increases exponentially throughout the length of the attempted synchronization of visual presentation and music.

Example 3: Caribbean Beauty

Theme: Caribbean Beauty

Tracks for 15 Second Ads have the number 15 after its name. Tracks created for 30 second Ads have the number 30 after the name and tracks created for 60 second ads have the number 60 after the name. The names can be abbreviated. Example: Caribbean Beauty's name has been abbreviated to "Carib". Every track with a name that begins with "Carib_15" has been designed to fit precisely in a 15 second Commercial. In many of the toolboxes, kits, methods, etc., the ending pieces of the 15 Second, 30 Second and 60 second version is the same. The toolboxes, kits, methods, etc., herein make it easy for a user to find everything a user wants grouped by commercial length.

There are also alternate endings with room for Voice Over in the most common locations of audio for commercials. A user can identify the tracks that are made this way by the "VO" in the track name. The track name that has VO will often include an approximation of where the VO is designed to serve best.

Some tracks have the letters "EX". This means "Extended". These tracks play a little bit longer.

Some kits have music that gives the user several choices; for example the melody can allow for instruments to be introduced one at a time. If this is an option with a kit, a user will see "V.1_A" for "Instrument 1" and "V.1_B" for "Instrument(s) two" so that a user is able to add his/her tracks in a proper sequence.

Some tracks may be called "Interlude". These tracks add a slight change in the feel of the music.

If a track has a "P", that indicates there is a "Pick-up" at the beginning of the track. A "pick-up" is music that begins before the downbeat. For example, it can be a bit of drums that kicks in the melody.

The track (section) names can be identified with an "A", "B", etc. Such identifiers indicate a good working order for the tracks best when placed in the indicated order.

Musical hits.

Certain of the melodies have points, or hits, in them that are designed to give significance to the visual when properly synced. There are natural hits in melodies and the music in the toolboxes, kits, methods, etc., herein identify such hits, as well as artificial hits if desired, so that the user can use them as desired. These hits are identified precisely, preferably to within 2 msec, 1 msec, etc. In some embodiments, such hits are identified with an "H". If desired, many hits can be lined up at an exact frame where a user would like emphasis for the visual. Some melodies work better if a user cuts to the hit. So, a user can have the option of cutting/editing the visual to the audio, or vice-versa.

Example For A 15 Second Ad Using Caribbean Beauty
Step ONE
Choose an ending according to if and or when the commercial will have VO.
For 29.97 ND FPS:
Place video editing software playhead to 15 seconds and drop the ending in front of the playhead and snap it into place.
For 25 FPS (used in Europe):
Use the same procedure if working with time and not frames when using kit blocks of audio.
Step TWO
Decide which beginning/intro of Caribbean Beauty a user would like to use.
The user has a choice of a regular version or a Pick-Up version.
This track can be placed at the starting point of the commercial.
Step Three
The user has several choices; it's fun to experiment and the music tracks play nicely together (i.e., keep a consistent theme). The user can choose an interlude or a Letter B section. A user can also change his/her mind and use an "EX" (Extended track A) instead of an interlude or Letter B section.
If a user is creating a 30 second or 60 second commercial there might be room to use one or more versions of "B", "C", "Interlude" and Hit designed tracks,
Example For A 30 Second Ad Using Caribbean Beauty
Step ONE
Choose an ending according to if or when the commercial will have VO.
Place Visual Editing Playhead at 30 seconds. Drop ending in front of playhead and snap it into place
Step TWO
Decide which beginning/intro of Caribbean Beauty to use.
The user has a choice of a regular version or a Pick-Up version.
This track can be placed at the starting point of the commercial.
Step Three
The user has several choices; it's fun to experiment and the music tracks play nicely together (i.e., keep a consistent theme). The user can choose an interlude or a Letter B section. A user can also change his/her mind and use an "EX" (Extended track A) instead of an interlude or Letter B section.

Example 4: Rumba and Coke

Figure 2A:
FIGS. 2a and 2b depict a further example of the present toolboxes, digital audio track, kits, systems, methods, etc., herein. This example provides a 15 second musical piece entitle "Rumba and Coke".
Figure 2B:
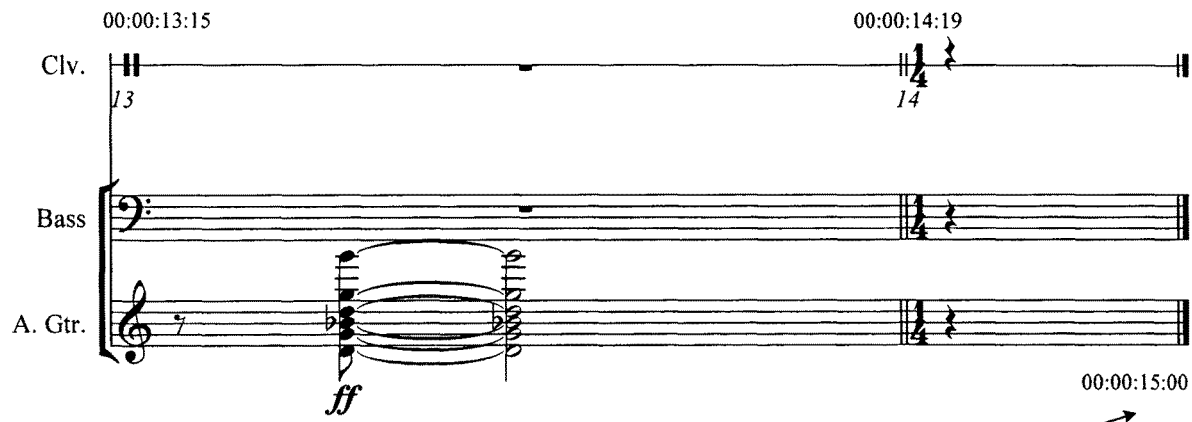

Example 4 refers to FIGS. 2a and 2b and shows a further example of the present toolboxes, digital audio track, kits, systems, methods, etc., herein. This example provides a 15 second musical piece entitle "Rumba and Coke".

This Example and FIGS. 2a and 2b show an example of the fractional tempo technique discussed herein, which is one of the techniques that can be used to ensure optimal synchronization. In this example, a 159.69 fractional tempo was chosen to leave one beat of space for the reverb or echo of the music to naturally decay. Because of the use of the current systems, the last one beat bar ends at precisely 15 seconds. In other words, the last beat SMPTE is at 00:00:15:00.

"Rumba and Coke" is designed so that the user can cut a commercial to fit the music.

The user has the choice to cut the film wherever he/she would like. Here are some SMPTE numbers that are suitable for many situations within the Rumba and Coke full song:
29.97 ND
0:00:02:27
0:00:05:18
0:00:08:17
0:00:17:07
0:00:12:11
0:00:13:19

These numbers are examples for editing that, when cut to, will provide a production with extra polish. A user can make multiple extra cuts in between these numbers, but in many instances the most dramatic cuts should be made at the numbers given.

Example 5: Two Approaches to the Musical Toolkit

A musical toolkit made to meet ATSC A/85 Broadcast specification. The toolkit comprises \a general description/instructions for the type of story each song "tells", and two choices for how to use a music kit, identified as "Algebra People" and "Geometry People".

For a "whole song technique", there's a full version of a song in each kit. A user can cut/edit his/her footage to the music as desired. The instructions provide a list of great spots to cut/edit, called 'hit points'. If the user cuts to at least about 7 of the suggested hit points it can make the music appear to be synchronized throughout the advertisement or other visual media being synced.

For "kit pieces technique", the pieces from the musical toolkit can be selected piecemeal for a chosen song. The instructions explain how to assemble music segments to get a custom sounding piece that matches the advertisement or other visual media being synced.

If desired, each toolkit has as an example track that can also double as a full track that can be used to edit a user's footage (the instructions can provide exact numbers and science if desired), or a user may build a version from the corresponding music kit that can make an impact for the viewer. The whole song technique and the kit pieces technique can be provided with a corresponding PDF that suggests places to make edits within a user's visual product.

All terms used herein are used in accordance with their ordinary meanings unless the context or definition clearly indicates otherwise. Also unless expressly indicated otherwise, in the specification the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a," "an," and "the" include the plural reference unless expressly stated, or the context clearly indicates, otherwise.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims or other claim having adequate support in the discussion and figures herein.

What is claimed is:

1. A digital audio toolbox providing a plurality of precisely timed audio components configured to be combined with and synced to at least one digital media track, the precisely timed audio components comprising a single audio theme and comprising at least two respective sections selected from a first section identified as an audio beginning section, a second section identified as an audio interlude section comprising a plurality of selectable audio interlude versions, and a third section identified as an audio ending section, wherein each of the first, second and third sections each comprise several precisely timed audio components each having at least one precisely timed hit, wherein each of the precisely timed audio components and the precisely timed hit arc identified within 2 msecs of a beginning of the respective section, and wherein each of the several precisely timed audio components having a specific length of time, such that the precisely timed audio components are temporally configured to be temporally accurate to fit together within 2 msecs of a desired length of time without altering the specific length of time of the precisely timed audio components, and wherein the toolbox further comprises directions identifying within 2 msecs the precisely timed hits.

2. The digital audio toolbox of claim 1 wherein the audio components comprise musical components.

3. The digital audio toolbox of claim 1 wherein the audio components consist essentially of musical components.

4. The digital audio toolbox of claim 1 wherein the audio components further comprise at least one silent section.

5. The digital audio toolbox of claim 1 wherein the audio components further comprise varied volume levels.

6. The digital audio toolbox of claim 1 wherein the audio components further comprise at least one section configured to accommodate a voice over.

7. The digital audio toolbox of claim 1 wherein the audio beginning section further comprises a pick-up component.

8. The digital audio toolbox of claim 1 wherein the audio beginning section further comprises at least two beginning versions, a first beginning version comprising a pick-up component and a second beginning version without a pick-up component.

9. The digital audio toolbox of claim 1 wherein the precisely timed audio components comprise at least one musical hit and the directions identify within 2 msec the temporal location of such musical hits.

10. The digital audio toolbox of claim 1 wherein temporal locations within the precisely timed audio components are identified using SMPTE time code.

11. The digital audio toolbox of claim 1 wherein the digital audio toolbox further comprises a full-length audio version generated from the audio beginning section, the audio interlude section and the audio ending section.

12. The digital audio toolbox of claim 11 wherein the full-length audio version comprises a plurality of musical hits and the directions identify temporal timecode locations of such musical hits.

13. The digital audio toolbox of claim 1 wherein the directions comprise at least one decision tree comprising step-by-step instructions for a user to use the digital audio toolbox.

14. The digital audio toolbox of claim 1 wherein the toolbox further comprises a cue sheet comprising information to be provided to a Performance Rights Organization (PRO).

15. A digital media track created using the digital audio toolbox of claim 1.

16. A digital media track comprising unaltered, precisely timed audio components comprising a single audio theme and at least two respective sections comprising a first section identified as an audio beginning section, a second section identified as an audio interlude section comprising a plurality of selectable audio interlude versions, and a third section identified as an audio ending section, wherein the precisely timed audio components each have at least one precisely timed bit identified within 2 msecs of a beginning of the respective section and wherein the precisely timed audio components are temporally configured to fit together within 2 msecs of a desired length of time corresponding to a length of a digital media track.

17. The digital media track of claim 16 wherein the audio components comprise musical components.

18. The digital media track of claim 16 wherein the audio components consist essentially of musical components.

19. The digital media track of claim 16 wherein the audio components further comprise at least one silent section.

20. The digital media track of claim 16 wherein the audio components further comprise at least one section configured to accommodate a voice over.

21. The digital media track of claim 16 wherein the audio beginning section further comprises at least two beginning versions, a first beginning version comprising a pick-up component and a second beginning version without a pick-up component.

22. The digital media track of claim 16 wherein the precisely timed audio components comprise at least one musical hit identified within 2 msec of a temporal location of such musical hit.

23. The digital media track of claim 16 wherein temporal locations within the precisely timed audio components are identified using SMPTE time code.

24. The digital media track of claim 16 wherein the digital media track further comprises a full-length audio version generated from the audio beginning section, the audio interlude section and the audio ending section.

* * * * *